United States Patent
Behles et al.

(10) Patent No.: US 10,671,165 B2
(45) Date of Patent: Jun. 2, 2020

(54) METHOD AND DISPLAY DEVICE WITH TACTILE FEEDBACK

(71) Applicant: Nokia Technologies Oy, Espoo (FI)

(72) Inventors: Thorsten Behles, Kangasala (FI); Marko Yliaho, Tampere (FI)

(73) Assignee: Nokia Technologies Oy, Espoo (FI)

( * ) Notice: Subject to any disclaimer, the term of this patent is extended or adjusted under 35 U.S.C. 154(b) by 160 days.

(21) Appl. No.: 14/426,073

(22) PCT Filed: Sep. 25, 2012

(86) PCT No.: PCT/IB2012/005100
§ 371 (c)(1),
(2) Date: Mar. 4, 2015

(87) PCT Pub. No.: WO2014/049392
PCT Pub. Date: Apr. 3, 2014

(65) Prior Publication Data
US 2015/0253850 A1    Sep. 10, 2015

(51) Int. Cl.
*G06F 3/01* (2006.01)
*G06F 3/0488* (2013.01)
(Continued)

(52) U.S. Cl.
CPC ............ *G06F 3/016* (2013.01); *G06F 3/0482* (2013.01); *G06F 3/0488* (2013.01);
(Continued)

(58) Field of Classification Search
None
See application file for complete search history.

(56) References Cited

U.S. PATENT DOCUMENTS 6,803,905 B1 * 10/2004 Capps ................. G06F 3/04886
345/172
7,418,560 B2    8/2008 Wintergerst
(Continued)

FOREIGN PATENT DOCUMENTS

CN    102099768 A    6/2011
CN    102349039 A    2/2012
(Continued)

OTHER PUBLICATIONS

Extended European Search Report received for corresponding European Patent Application No. 12885402.3, dated Apr. 26, 2016, 7 pages.
(Continued)

*Primary Examiner* — Toan H Vu
(74) *Attorney, Agent, or Firm* — Harrington & Smith

(57) ABSTRACT

An apparatus comprising: a receiver configured to receive data for at least one user interface element to be displayed on a displayed user interface at a location on a display and a tactile feedback signal indicator associated with the at least one user interface element; a touch sensor configured to determine at least one touch location corresponds to the at least one user interface element location of the displayed user interface; and a tactile effect generator configured to generate a tactile feedback signal to be output by the display dependent on the displayed user interface and based on the tactile feedback signal indicator such that the at least one user interface element provides a simulated experience.

20 Claims, 7 Drawing Sheets

(51) Int. Cl.
*G06F 3/0482* (2013.01)
*G06F 3/0484* (2013.01)
*H04L 12/58* (2006.01)

(52) U.S. Cl.
CPC ........ G06F 3/04842 (2013.01); H04L 51/046 (2013.01); *G06F 2203/014* (2013.01)

(56) References Cited

U.S. PATENT DOCUMENTS

| | | | | |
|---|---|---|---|---|
| 7,961,833 | B2* | 6/2011 | Albasini | H03L 7/0891 375/376 |
| 8,954,887 | B1* | 2/2015 | Tseng | G06F 3/04812 715/808 |
| 2002/0177471 | A1 | 11/2002 | Kaaresoja et al. | |
| 2006/0061545 | A1 | 3/2006 | Hughes et al. | |
| 2006/0229901 | A1 | 10/2006 | Dwyer et al. | |
| 2008/0287147 | A1 | 11/2008 | Grant et al. | |
| 2009/0167704 | A1* | 7/2009 | Terlizzi | G06F 3/016 345/173 |
| 2009/0195512 | A1* | 8/2009 | Pettersson | G06F 3/016 345/173 |
| 2009/0284482 | A1 | 11/2009 | Chin | |
| 2010/0020036 | A1* | 1/2010 | Hui | G06F 3/04886 345/173 |
| 2010/0220065 | A1 | 9/2010 | Ma | |
| 2010/0267424 | A1* | 10/2010 | Kim | G06F 3/016 455/566 |
| 2011/0167342 | A1* | 7/2011 | de la Pena | G06F 3/0488 715/702 |
| 2011/0210926 | A1* | 9/2011 | Pasquero | G06F 3/016 345/173 |
| 2011/0225534 | A1* | 9/2011 | Wala | G06F 3/012 715/772 |
| 2011/0248916 | A1* | 10/2011 | Griffin | G06F 3/016 345/157 |
| 2011/0285666 | A1 | 11/2011 | Poupyrev et al. | |
| 2012/0028577 | A1 | 2/2012 | Rodriguez et al. | |
| 2012/0109836 | A1 | 5/2012 | Chen et al. | |
| 2012/0206247 | A1* | 8/2012 | Bhatia | G06F 3/016 340/407.1 |
| 2012/0326989 | A1* | 12/2012 | Verthein | G06F 3/04847 345/173 |
| 2012/0327006 | A1* | 12/2012 | Israr | G06F 3/016 345/173 |
| 2013/0082824 | A1* | 4/2013 | Colley | G06F 3/0488 340/6.1 |
| 2013/0205255 | A1* | 8/2013 | We | G06F 3/0482 715/810 |
| 2013/0311954 | A1* | 11/2013 | Minkkinen | G06F 3/04812 715/862 |
| 2014/0089791 | A1* | 3/2014 | Ishimaru | G06F 3/0416 715/702 |
| 2016/0070399 | A1* | 3/2016 | Hotelling | G06F 1/1626 345/173 |

FOREIGN PATENT DOCUMENTS

| | | |
|---|---|---|
| KR | 2010-0017875 A | 2/2010 |
| KR | 2012-0021540 A | 3/2012 |
| KR | 2012-0060763 A | 6/2012 |
| WO | WO-0203172 A2 | 1/2002 |
| WO | 2013/136133 A1 | 9/2013 |

OTHER PUBLICATIONS

Office action received for corresponding Chinese Patent Application No. 201280075995.7, dated Sep. 9, 2016, 9 pages of office action and 3 pages of office action translation available.

International Search Report and Written Opinion received for corresponding Patent Cooperation Treaty Application No. PCT/IB2012/055100, dated Sep. 25, 2012, 14 pages.

Kim et al., "Haptics in a Social Network Service: Tweeting With Motion for Sharing Physical Experiences", IEEE World Haptics Conference (WHC), Jun. 21-24, 2011, pp. 311-315.

Heikkinen et al., "Expectations for User Experience in Haptic Communication With Mobile Devices", Proceedings of the 11th International Conference on Human-Computer Interaction with Mobile Devices and Services, Article No. 28, Sep. 15-18, 2009, 10 pages.

"Haptics: Improving the Mobile User Experience Through Touch", Immersion Corporation, 2007, 12 pages.

Office action received for corresponding Korean Patent Application No. 2015-7010554, dated Feb. 18, 2016, 4 pages of office action and no pages of office action translation available.

* cited by examiner

METHOD AND DISPLAY DEVICE WITH TACTILE FEEDBACK

RELATED APPLICATION

This application was originally filed as PCT Application No. PCT/IB2012/055100 filed Sep. 25, 2012.

FIELD

The present invention relates to a providing tactile functionality. The invention further relates to, but is not limited to, display apparatus providing tactile functionality for use in mobile devices.

BACKGROUND

Many portable devices, for example mobile telephones, are equipped with a display such as a glass or plastic display window for providing information to the user. Furthermore such display windows are now commonly used as touch sensitive inputs. In some cases the apparatus can provide a visual feedback and audible feedback when recording a touch input. In some further devices the audible feedback is augmented with a vibrating motor used to provide a haptic feedback so the user knows that the device has accepted the input.

Social media, such as implemented by Facebook, Twitter and others allows a user to provide or view a written status update or some other user generated content such as image, video or audio content.

Pure audio feedback has the disadvantage that it is audible by people around you and therefore able to distract or cause a nuisance especially on public transport.

STATEMENT

According to an aspect, there is provided a method comprising: generating at least one user interface element to be displayed on a displayed user interface at a location on a display; generating a tactile feedback signal indicator configured to indicate a tactile feedback signal to be output; and associating the tactile feedback signal indicator with the at least one user interface element to be displayed on a displayed user interface at the location on the display.

Associating the tactile feedback signal indicator with the at least one user interface element to be displayed on a displayed user interface at the location on the display may comprise at least one of: uploading the at least one user interface element and the tactile feedback signal indicator to a content server; transmitting control data for selecting the at least one user interface element and the tactile feedback signal indicator from a server apparatus; transmitting a short message service message comprising the at least one user interface element and the tactile feedback signal indicator; transmitting a network message comprising the at least one user interface element and the tactile feedback signal indicator; transmitting a server message comprising the at least one user interface element and the tactile feedback signal indicator; and transmitting an application message comprising the at least one user interface element and the tactile feedback signal indicator.

The tactile feedback signal indicator may comprise at least one of: a tactile feedback signal file; a tactile feedback signal link to a memory location within an apparatus; and a tactile feedback signal link to a network location external to an apparatus.

Generating at least one user interface element to be displayed on a displayed user interface at a location on a display may comprise at least one of: selecting at least one defined user interface element; selecting at least one touch based response tag; generating at least one defined user interface element; generating text configured to generate the at least one user interface element to be displayed on a displayed user interface at a location on a display; and generating data configured to generate the at least one user interface element to be displayed on a displayed user interface at a location on a display.

The touch based response tag may comprise at least one of: a touch location; a defined number of touches; a touch pressure; a touch duration; a touch speed; and a touch direction.

According to a second aspect there is provided a method comprising: receiving data for at least one user interface element to be displayed on a displayed user interface at a location on a display and a tactile feedback signal indicator associated with the at least one user interface element; determining at least one touch location corresponds to the at least one user interface element location of the displayed user interface; and generating a tactile feedback signal to be output by the display dependent on the displayed user interface and based on the tactile feedback signal indicator such that the at least one user interface element provides a simulated experience.

Receiving the data for at least one user interface element to be displayed on a displayed user and the tactile feedback signal indicator associated with the at least one user interface element interface may comprise at least one of: receiving a short message service message comprising the data; downloading the at least one user interface element and the tactile feedback signal indicator from a content server; receiving control data for selecting the at least one user interface element and the tactile feedback signal indicator from a server apparatus; receiving a network message comprising the data; receiving a server message comprising the data; and receiving an application message comprising the data.

The tactile feedback signal indicator may comprise at least one of: a tactile feedback signal file; a recorded audio signal; an indicator for selecting at least one predefined audio signal; at least one base tactile feedback signal; at least one tactile feedback signal processing characteristic; at least one tactile feedback signal processing characteristic value; a tactile feedback signal link to a memory location within an apparatus; and a tactile feedback signal link to a network location external to an apparatus.

The user interface element may have associated at least one field having a value and wherein generating a tactile feedback signal may comprise generating the tactile feedback signal based on the value.

The field may have a range of different values and generating the tactile feedback signal based on the value may comprise generating a different tactile feedback signal for each different value within the range of values.

The field may have a range of different values and generating the tactile feedback signal based on the value may comprise: determining a base tactile feedback signal based on the user interface element; and modifying the base tactile feedback signal based on the value of the field.

Modifying the base tactile feedback signal may comprise at least one of: modulating the amplitude of the base tactile feedback signal based on the value of the field; and modulating the frequency of the base tactile feedback signal based on the value of the field.

The user interface element may be a user identifier displayed element, wherein generating a tactile feedback signal to be output by the display dependent on user interface element may comprise generating a tactile feedback signal associated with the status of the user identified by the user identifier such that the at least one user interface element provides a simulated experience of the status of the user The user interface element may be a social media user interface element, wherein generating a tactile feedback signal to be output by the display dependent on user interface element may comprise generating a tactile feedback signal associated with the social media status identified by the user identifier such that the at least one user interface element provides a simulated experience of the social media status.

The user interface element may be a universal resource link user interface element, wherein generating a tactile feedback signal to be output by the display dependent on user interface element may comprise generating a tactile feedback signal associated with the universal resource link value identified by the user identifier such that the at least one user interface element provides a simulated experience of the universal resource link value.

The user interface element may be an application user interface element, wherein generating a tactile feedback signal to be output by the display dependent on user interface element may comprise generating a tactile feedback signal associated with the application user interface element identified by the user identifier such that the at least one user interface element provides a simulated experience of the an application user interface element, The user interface element may be a profile picture user interface element, wherein generating a tactile feedback signal to be output by the display dependent on user interface element may comprise generating a tactile feedback signal associated with the application user interface element identified by the user identifier such that the at least one user interface element provides a simulated experience of the profile picture.

The user interface element may be a comment user interface element, wherein generating a tactile feedback signal to be output by the display dependent on user interface element may comprise generating a tactile feedback signal associated with the comment user interface element date identified by the user identifier such that the at least one user interface element provides a simulated experience of the comment user interface element date.

The user interface element may be a hashtag user interface element, wherein generating a tactile feedback signal to be output by the display dependent on user interface element may comprise generating a tactile feedback signal associated with the hashtag user interface element value identified by the user identifier such that the at least one user interface element provides a simulated experience of the hashtag.

The user interface element may be a mention user interface element, wherein generating a tactile feedback signal to be output by the display dependent on user interface element may comprise generating a tactile feedback signal associated with the mention user interface element frequency identified by the user identifier such that the at least one user interface element provides a simulated experience of the mention user interface element frequency.

The user interface element may be a keyword search result user interface element, wherein generating a tactile feedback signal to be output by the display dependent on user interface element may comprise generating a tactile feedback signal associated with the keyword search result user interface element value identified by the user identifier such that the at least one user interface element provides a simulated experience of the keyword search result.

The user interface element may be a provided content user interface element, wherein generating a tactile feedback signal to be output by the display dependent on user interface element may comprise generating a tactile feedback signal associated with the provided content user interface element value identified by the user identifier such that the at least one user interface element provides a simulated experience of the provided content.

The user interface element may be a dialogue box user interface element, wherein generating a tactile feedback signal to be output by the display dependent on user interface element may comprise generating a tactile feedback signal associated with the dialogue box displayed status identified by the user identifier such that the at least one user interface element provides a simulated experience of the dialogue box status.

The method may further comprise generating an audio feedback signal to be output by the display dependent on user interface element.

The method may further comprise outputting on the display the tactile feedback signal, such that a user experiences at the location of the at least one user interface element a tactile display displacement based on the user interface element.

According to a third aspect there is provided an apparatus comprising: means for generating at least one user interface element to be displayed on a displayed user interface at a location on a display; means for generating a tactile feedback signal indicator configured to indicate a tactile feedback signal to be output; and means for associating the tactile feedback signal indicator with the at least one user interface element to be displayed on a displayed user interface at the location on the display.

The means for associating the tactile feedback signal indicator with the at least one user interface element to be displayed on a displayed user interface at the location on the display may comprise at least one of: means for uploading the at least one user interface element and the tactile feedback signal indicator to a content server, means for transmitting control data for selecting the at least one user interface element and the tactile feedback signal indicator from a server apparatus; means for transmitting a short message service message comprising the at least one user interface element and the tactile feedback signal indicator; means for transmitting a network message comprising the at least one user interface element and the tactile feedback signal indicator; means for transmitting a server message comprising the at least one user interface element and the tactile feedback signal indicator; and means for transmitting an application message comprising the at least one user interface element and the tactile feedback signal indicator.

The tactile feedback signal indicator may comprise at least one of: a tactile feedback signal file; a recorded audio signal; an indicator for selecting at least one predefined audio signal; at least one base tactile feedback signal; at least one tactile feedback signal processing characteristic; at least one tactile feedback signal processing characteristic value; a tactile feedback signal link to a memory location within the apparatus; and a tactile feedback signal link to a network location external to the apparatus.

The means for generating at least one user interface element to be displayed on a displayed user interface at a location on a display may comprise at least one of: means for selecting at least one defined user interface element; means for selecting at least one touch based response tag; means for generating at least one defined user interface element; means for generating text configured to generate the at least one user interface element to be displayed on a displayed user interface at a location on a display; and means for generating data configured to generate the at least one user interface element to be displayed on a displayed user interface at a location on a display.

The touch based response tag may comprise at least one of: a touch location; a defined number of touches; a touch pressure; a touch duration; a touch speed; and a touch direction.

According to a fourth aspect there is provided an apparatus comprising: means for receiving data for at least one user interface element to be displayed on a displayed user interface at a location on a display and a tactile feedback signal indicator associated with the at least one user interface element; means for determining at least one touch location corresponds to the at least one user interface element location of the displayed user interface; and means for generating a tactile feedback signal to be output by the display dependent on the displayed user interface and based on the tactile feedback signal indicator such that the at least one user interface element provides a simulated experience.

The means for receiving the data for at least one user interface element to be displayed on a displayed user interface and the tactile feedback signal indicator associated with the at least one user interface element interface may comprise at least one of: means for receiving a short message service message comprising the data; means for downloading the at least one user interface element and the tactile feedback signal indicator from a content server; means for receiving control data for selecting the at least one user interface element and the tactile feedback signal indicator from a server apparatus; means for receiving a network message comprising the data; means for receiving a server message comprising the data; and means for receiving an application message comprising the data.

The tactile feedback signal indicator may comprise at least one of: a tactile feedback signal file; a recorded audio signal; an indicator for selecting at least one predefined audio signal; at least one base tactile feedback signal; at least one tactile feedback signal processing characteristic; at least one tactile feedback signal processing characteristic value; a tactile feedback signal link to a memory location within the apparatus; and a tactile feedback signal link to a network location external to the apparatus.

The user interface element may have associated at least one field having a value and wherein the means for generating a tactile feedback signal may comprise means for generating the tactile feedback signal based on the value.

The field may have a range of different values and the means for generating the tactile feedback signal based on the value may comprise means for generating a different tactile feedback signal for each different value within the range of values.

The field may have a range of different values and the means for generating the tactile feedback signal based on the value may comprise: means for determining a base tactile feedback signal based on the user interface element; and means for modifying the base tactile feedback signal based on the value of the field.

The means for modifying the base tactile feedback signal may comprise at least one of: means for modulating the amplitude of the base tactile feedback signal based on the value of the field; and means for modulating the frequency of the base tactile feedback signal based on the value of the field.

The user interface element may be a user identifier displayed element, wherein the means for generating a tactile feedback signal to be output by the display dependent on user interface element may comprise means for generating a tactile feedback signal associated with the status of the user identified by the user identifier such that the at least one user interface element provides a simulated experience of the status of the user.

The user interface element may be a social media user interface element, wherein the means for generating a tactile feedback signal to be output by the display dependent on user interface element may comprise means for generating a tactile feedback signal associated with the social media status identified by the user identifier such that the at least one user interface element provides a simulated experience of the social media status.

The user interface element may be a universal resource link user interface element, wherein the means for generating a tactile feedback signal to be output by the display dependent on user interface element may comprise means for generating a tactile feedback signal associated with the universal resource link value identified by the user identifier such that the at least one user interface element provides a simulated experience of the universal resource link value.

The user interface element may be an application user interface element, wherein the means for generating a tactile feedback signal to be output by the display dependent on user interface element may comprise means for generating a tactile feedback signal associated with the application user interface element identified by the user identifier such that the at least one user interface element provides a simulated experience of the an application user interface element.

The user interface element may be a profile picture user interface element, wherein the means for generating a tactile feedback signal to be output by the display dependent on user interface element may comprise means for generating a tactile feedback signal associated with the application user interface element identified by the user identifier such that the at least one user interface element provides a simulated experience of the profile picture.

The user interface element may be a comment user interface element, wherein the means for generating a tactile feedback signal to be output by the display dependent on user interface element may comprise means for generating a tactile feedback signal associated with the comment user interface element date identified by the user identifier such that the at least one user interface element provides a simulated experience of the comment user interface element date.

The user interface element may be a hashtag user interface element, wherein the means for generating a tactile feedback signal to be output by the display dependent on user interface element may comprise means for generating a tactile feedback signal associated with the hashtag user interface element value identified by the user identifier such that the at least one user interface element provides a simulated experience of the hashtag.

The user interface element may be a mention user interface element, wherein the means for generating a tactile feedback signal to be output by the display dependent on user interface element may comprise means for generating a tactile feedback signal associated with the mention user interface element frequency identified by the user identifier such that the at least one user interface element provides a simulated experience of the mention user interface element frequency.

The user interface element may be a keyword search result user interface element, wherein the means for generating a tactile feedback signal to be output by the display dependent on user interface element may comprise means for generating a tactile feedback signal associated with the keyword search result user interface element value identified by the user identifier such that the at least one user interface element provides a simulated experience of the keyword search result.

The user interface element may be a provided content user interface element, wherein the means for generating a tactile feedback signal to be output by the display dependent on user interface element may comprise means for generating a tactile feedback signal associated with the provided content user interface element value identified by the user identifier such that the at least one user interface element provides a simulated experience of the provided content.

The user interface element may be a dialogue box user interface element, wherein the means for generating a tactile feedback signal to be output by the display dependent on user interface element may comprise means for generating a tactile feedback signal associated with the dialogue box displayed status identified by the user identifier such that the at least one user interface element provides a simulated experience of the dialogue box status.

The apparatus may further comprise means for generating an audio feedback signal to be output by the display dependent on user interface element.

The apparatus may further comprise means for outputting on the display the tactile feedback signal, such that a user experiences at the location of the at least one user interface element a tactile display displacement based on the user interface element.

According to a fifth aspect there is provided an apparatus comprising at least one processor and at least one memory including computer code for one or more programs, the at least one memory and the computer code configured to with the at least one processor cause the apparatus to at least perform: generate at least one user interface element to be displayed on a displayed user interface at a location on a display; generate a tactile feedback signal indicator configured to indicate a tactile feedback signal to be output; and associate the tactile feedback signal indicator with the at least one user interface element to be displayed on a displayed user interface at the location on the display.

Associating the tactile feedback signal indicator with the at least one user interface element to be displayed on a displayed user interface at the location on the display may cause the apparatus to further perform at least one of: upload the at least one user interface element and the tactile feedback signal indicator to a content server; transmit control data for selecting the at least one user interface element and the tactile feedback signal indicator from a server apparatus; transmit a short message service message comprising the at least one user interface element and the tactile feedback signal indicator transmit a network message comprising the at least one user interface element and the tactile feedback signal indicator; transmit a server message comprising the at least one user interface element and the tactile feedback signal indicator; and transmit an application message comprising the at least one user interface element and the tactile feedback signal indicator.

The tactile feedback signal indicator may comprise at least one of: a recorded audio signal; an indicator for selecting at least one predefined audio signal; at least one base tactile feedback signal; at least one tactile feedback signal processing characteristic; at least one tactile feedback signal processing characteristic value; a tactile feedback signal file; a tactile feedback signal link to a memory location within the apparatus; and a tactile feedback signal link to a network location external to the apparatus.

Generating at least one user interface element to be displayed on a displayed user interface at a location on a display may cause the apparatus to perform at least one of: select at least one defined user interface element; select at least one touch based response tag; generate at least one defined user interface element; generate text configured to generate the at least one user interface element to be displayed on a displayed user interface at a location on a display; and generate data configured to generate the at least one user interface element to be displayed on a displayed user interface at a location on a display.

The touch based response tag may comprise at least one of: a touch location; a defined number of touches; a touch pressure; a touch duration; a touch speed; and a touch direction.

According to a sixth aspect there is provided an apparatus comprising at least one processor and at least one memory including computer code for one or more programs, the at least one memory and the computer code configured to with the at least one processor cause the apparatus to at least perform: receive data for at least one user interface element to be displayed on a displayed user interface at a location on a display and a tactile feedback signal indicator associated with the at least one user interface element; determine at least one touch location corresponds to the at least one user interface element location of the displayed user interface; and generate a tactile feedback signal to be output by the display dependent on the displayed user interface and based on the tactile feedback signal indicator such that the at least one user interface element provides a simulated experience.

Receiving the data for at least one user interface element to be displayed on a displayed user and the tactile feedback signal indicator associated with the at least one user interface element interface may cause the apparatus to further perform at least one of: download the at least one user interface element and the tactile feedback signal indicator from a content server; receive control data for selecting the at least one user interface element and the tactile feedback signal indicator from a server apparatus; receive a short message service message comprising the data; receive a network message comprising the data; receive a server message comprising the data; and receive an application message comprising the data.

The tactile feedback signal indicator may comprise at least one of: a tactile feedback signal file; a recorded audio signal; an indicator for selecting at least one predefined audio signal; at least one base tactile feedback signal; at least one tactile feedback signal processing characteristic; at least one tactile feedback signal processing characteristic value; a tactile feedback signal link to a memory location within the apparatus; and a tactile feedback signal link to a network location external to the apparatus.

The user interface element may have associated at least one field having a value and wherein generating a tactile feedback signal may cause the apparatus to perform generating the tactile feedback signal based on the value.

The field may have a range of different values and generating the tactile feedback signal based on the value may cause the apparatus to perform generating a different tactile feedback signal for each different value within the range of values.

The field may have a range of different values and generating the tactile feedback signal based on the value may cause the apparatus to perform: determining a base tactile feedback signal based on the user interface element; and modifying the base tactile feedback signal based on the value of the field.

Modifying the base tactile feedback signal may cause the apparatus to perform at least one of: modulating the amplitude of the base tactile feedback signal based on the value of the field; and modulating the frequency of the base tactile feedback signal based on the value of the field.

The user interface element may be a user identifier displayed element, wherein generating a tactile feedback signal to be output by the display dependent on user interface element may cause the apparatus to perform generating a tactile feedback signal associated with the status of the user identified by the user identifier such that the at least one user interface element provides a simulated experience of the status of the user.

The user interface element may be a social media user interface element, wherein generating a tactile feedback signal to be output by the display dependent on user interface element may cause the apparatus to perform generating a tactile feedback signal associated with the social media status identified by the user identifier such that the at least one user interface element provides a simulated experience of the social media status.

The user interface element may be a universal resource link user interface element, wherein generating a tactile feedback signal to be output by the display dependent on user interface element may cause the apparatus to perform generating a tactile feedback signal associated with the universal resource link value identified by the user identifier such that the at least one user interface element provides a simulated experience of the universal resource link value.

The user interface element may be an application user interface element, wherein generating a tactile feedback signal to be output by the display dependent on user interface element may cause the apparatus to perform generating a tactile feedback signal associated with the application user interface element identified by the user identifier such that the at least one user interface element provides a simulated experience of the an application user interface element.

The user interface element may be a profile picture user interface element, wherein generating a tactile feedback signal to be output by the display dependent on user interface element may cause the apparatus to perform generating a tactile feedback signal associated with the application user interface element identified by the user identifier such that the at least one user interface element provides a simulated experience of the profile picture.

The user interface element may be a comment user interface element, wherein generating a tactile feedback signal to be output by the display dependent on user interface element may cause the apparatus to perform generating a tactile feedback signal associated with the comment user interface element date identified by the user identifier such that the at least one user interface element provides a simulated experience of the comment user interface element date.

The user interface element may be a hashtag user interface element, wherein generating a tactile feedback signal to be output by the display dependent on user interface element may cause the apparatus to perform generating a tactile feedback signal associated with the hashtag user interface element value identified by the user identifier such that the at least one user interface element provides a simulated experience of the hashtag.

The user interface element may be a mention user interface element, wherein generating a tactile feedback signal to be output by the display dependent on user interface element may cause the apparatus to perform generating a tactile feedback signal associated with the mention user interface element frequency identified by the user identifier such that the at least one user interface element provides a simulated experience of the mention user interface element frequency.

The user interface element may be a keyword search result user interface element, wherein generating a tactile feedback signal to be output by the display dependent on user interface element may causes the apparatus to perform generating a tactile feedback signal associated with the keyword search result user interface element value identified by the user identifier such that the at least one user interface element provides a simulated experience of the keyword search result.

The user interface element may be a provided content user interface element, wherein generating a tactile feedback signal to be output by the display dependent on user interface element may cause the apparatus to perform generating a tactile feedback signal associated with the provided content user interface element value identified by the user identifier such that the at least one user interface element provides a simulated experience of the provided content.

The user interface element may be a dialogue box user interface element, wherein generating a tactile feedback signal to be output by the display dependent on user interface element may cause the apparatus to perform generating a tactile feedback signal associated with the dialogue box displayed status identified by the user identifier such that the at least one user interface element provides a simulated experience of the dialogue box status.

The apparatus may further be caused to perform generating an audio feedback signal to be output by the display dependent on user interface element.

The apparatus may further be caused to perform outputting on the display the tactile feedback signal, such that a user experiences at the location of the at least one user interface element a tactile display displacement based on the user interface element.

According to a seventh aspect there is provided an apparatus comprising: a user interface element generator configured to generate at least one user interface element to be displayed on a displayed user interface at a location on a display; a tactile feedback signal indicator generator configured to generate a tactile feedback signal indicator configured to indicate a tactile feedback signal to be output; and an associator configured to associate the tactile feedback signal indicator with the at least one user interface element to be displayed on a displayed user interface at the location on the display.

The associator may comprise at least one of: an uploader configured to upload the at least one user interface element and the tactile feedback signal indicator to a content server a transmitter configured to transmit control data for selecting the at least one user interface element and the tactile feedback signal indicator from a server apparatus; an sms transmitter configured to transmit a short message service message comprising the at least one user interface element and the tactile feedback signal indicator; a network transmitter configured to transmit a network message comprising the at least one user interface element and the tactile feedback signal indicator; a server transmitter configured to transmit a server message comprising the at least one user interface element and the tactile feedback signal indicator; and an application transmitter configured to transmit an application message comprising the at least one user interface element and the tactile feedback signal indicator.

The tactile feedback signal indicator may comprise at least one of: a tactile feedback signal file; a recorded audio signal; an indicator for selecting at least one predefined audio signal; at least one base tactile feedback signal; at least one tactile feedback signal processing characteristic; at least one tactile feedback signal processing characteristic value; a tactile feedback signal link to a memory location within the apparatus; and a tactile feedback signal link to a network location external to the apparatus.

The user interface element generator may comprise at least one of: a defined interface selector configured to selecting at least one defined user interface element; a tag selector configured to select at least one touch based response tag; a defined user interface element generator configured to generate at least one defined user interface element; a text generator configured to generate text configured to generate the at least one user interface element to be displayed on a displayed user interface at a location on a display; and a data generator configured to generate data configured to generate the at least one user interface element to be displayed on a displayed user interface at a location on a display.

The touch based response tag may comprise at least one of: a touch location; a defined number of touches; a touch pressure; a touch duration; a touch speed; and a touch direction.

According to an eighth aspect there is provided an apparatus comprising: a receiver configured to receive data for at least one user interface element to be displayed on a displayed user interface at a location on a display and a tactile feedback signal indicator associated with the at least one user interface element; a touch sensor configured to determine at least one touch location corresponds to the at least one user interface element location of the displayed user interface; and a tactile effect generator configured to generate a tactile feedback signal to be output by the display dependent on the displayed user interface and based on the tactile feedback signal indicator such that the at least one user interface element provides a simulated experience.

The receiver may comprise at least one of: a content server downloader configured to download the at least one user interface element and the tactile feedback signal indicator from a content server; a control data receiver configured to receive control data for selecting the at least one user interface element and the tactile feedback signal indicator from a server apparatus; a sms receiver configured to receive a short message service message comprising the data; a network receiver configured to receive a network message comprising the data; a client receiver configured to receive a server message comprising the data; and an application message receiver configured to receive an application message comprising the data.

The tactile feedback signal indicator may comprise at least one of: a tactile feedback signal file; a recorded audio signal; an indicator for selecting at least one predefined audio signal; at least one base tactile feedback signal; at least one tactile feedback signal processing characteristic; at least one tactile feedback signal processing characteristic value; a tactile feedback signal link to a memory location within the apparatus; and a tactile feedback signal link to a network location external to the apparatus.

The user interface element may have associated at least one field having a value and wherein the tactile effect generator may be configured to generate the tactile feedback signal based on the value.

The field may have a range of different values and the tactile effect generator may be configured to generate a different tactile feedback signal for each different value within the range of values.

The field may have a range of different values and the tactile effect generator may be configured to: determine a base tactile feedback signal based on the user interface element; and modify the base tactile feedback signal based on the value of the field.

The tactile effect generator may comprise: a signal amplitude modulator configured to change the amplitude of the base tactile feedback signal based on the value of the field; and a signal frequency modulator configured to change the frequency of the base tactile feedback signal based on the value of the field.

The user interface element may comprise at least one of: a social media user interface element; a dialogue box user interface element; an application user interface element; a universal resource link user interface element; a user identifier user interface element; a profile picture user interface element; a comment user interface element; a hashtag user interface element; a mention user interface element; a feedback user interface element; a keyword search result user interface element; and a provided content user interface element The user interface element may be a user identifier displayed element, wherein the tactile effect signal generator may be configured to generate a tactile feedback signal associated with the status of the user identified by the user identifier such that the at least one user interface element provides a simulated experience of the status of the user.

The user interface element may be a social media user interface element, wherein the tactile effect signal generator may be configured to generate a tactile feedback signal associated with the social media status identified by the user identifier such that the at least one user interface element provides a simulated experience of the social media status.

The user interface element may be a universal resource link user interface element, wherein the tactile effect signal generator may be configured to generate a tactile feedback signal associated with the universal resource link value identified by the user identifier such that the at least one user interface element provides a simulated experience of the universal resource link value.

The user interface element may be an application user interface element, wherein the tactile effect signal generator may be configured to generate a tactile feedback signal associated with the application user interface element identified by the user identifier such that the at least one user interface element provides a simulated experience of the an application user interface element.

The user interface element may be a profile picture user interface element, wherein the tactile effect signal generator may be configured to generate a tactile feedback signal associated with the application user interface element identified by the user identifier such that the at least one user interface element provides a simulated experience of the profile picture.

The user interface element may be a comment user interface element, wherein the tactile effect signal generator may be configured to generate a tactile feedback signal associated with the comment user interface element date identified by the user identifier such that the at least one user interface element provides a simulated experience of the comment user interface element date.

The user interface element may be a hashtag user interface element, wherein the tactile effect signal generator may be configured to generate a tactile feedback signal associated with the hashtag user interface element value identified by the user identifier such that the at least one user interface element provides a simulated experience of the hashtag.

The user interface element may be a mention user interface element, wherein the tactile effect signal generator may be configured to generate a tactile feedback signal associated with the mention user interface element frequency identified by the user identifier such that the at least one user interface element provides a simulated experience of the mention user interface element frequency.

The user interface element may be a keyword search result user interface element, wherein the tactile effect signal generator may be configured to generate a tactile feedback signal associated with the keyword search result user interface element value identified by the user identifier such that the at least one user interface element provides a simulated experience of the keyword search result.

The user interface element may be a provided content user interface element, wherein the tactile effect signal generator may be configured to generate a tactile feedback signal associated with the provided content user interface element value identified by the user identifier such that the at least one user interface element provides a simulated experience of the provided content.

The user interface element may be a dialogue box user interface element, wherein the tactile effect signal generator may be configured to generate a tactile feedback signal associated with the dialogue box displayed status identified by the user identifier such that the at least one user interface element provides a simulated experience of the dialogue box status.

The apparatus may further comprise at least one actuator configured to generate a display displacement configured to generate an acoustic wave dependent on user interface element.

The apparatus display may further be configured to output a tactile displacement based on the tactile feedback signal, such that a user experiences on the display at the location of the at least one user interface element a tactile display displacement based on the user interface element.

A computer program product stored on a medium for causing an apparatus to may perform the method as described herein.

An electronic device may comprise apparatus as described herein.

A chipset may comprise apparatus as described herein.

SUMMARY OF FIGURES

For better understanding of the present invention, reference will now be made by way of example to the accompanying drawings in which.

DESCRIPTION OF EXAMPLE EMBODIMENTS

The application describes apparatus and methods capable of generating, encoding, storing, transmitting and outputting tactile and acoustic outputs using a touch screen device.

Figure 1:
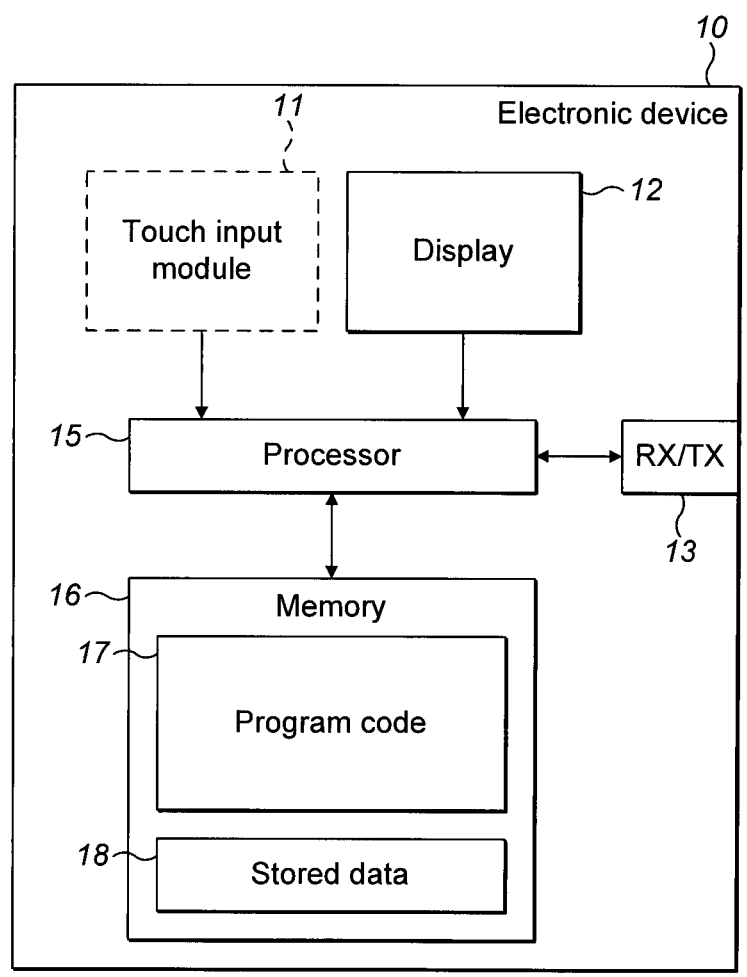
FIG. 1 shows schematically an apparatus suitable for employing some embodiments.

With respect to FIG. 1 a schematic block diagram of an example electronic device 10 or apparatus on which embodiments of the application can be implemented. The apparatus 10 is such embodiments configured to provide improved tactile and acoustic wave generation.

The apparatus 10 is in some embodiments a mobile terminal, mobile phone or user equipment for operation in a wireless communication system. In other embodiments, the apparatus is any suitable electronic device configured to provide an image display, such as for example a digital camera, a portable audio player (mp3 player), a portable video player (mp4 player). In other embodiments the apparatus can be any suitable electronic device with touch interface (which may or may not display information) such as a touch-screen or touch-pad configured to provide feedback when the touch-screen or touch-pad is touched. For example in some embodiments the touch-pad can be a touch-sensitive keypad which can in some embodiments have no markings on it and in other embodiments have physical markings or designations on the front window. The user can in such embodiments be notified of where to touch by a physical identifier—such as a raised profile, or a printed layer which can be illuminated by a light guide.

The apparatus 10 comprises a touch input module or user interface 11, which is linked to a processor 15. The processor 15 is further linked to a display 12. The processor 15 is further linked to a transceiver (TX/RX) 13 and to a memory 16.

In some embodiments, the touch input module 11 and/or the display 12 are separate or separable from the electronic device and the processor receives signals from the touch input module 11 and/or transmits and signals to the display 12 via the transceiver 13 or another suitable interface. Furthermore in some embodiments the touch input module 11 and display 12 are parts of the same component. In such embodiments the touch interface module 11 and display 12 can be referred to as the display part or touch display part.

The processor 15 can in some embodiments be configured to execute various program codes. The implemented program codes, in some embodiments can comprise such routines as touch processing, input simulation, or tactile effect simulation code where the touch input module inputs are detected and processed, effect feedback signal generation where electrical signals are generated which when passed to a transducer can generate tactile or haptic feedback to the user of the apparatus, or actuator processing configured to generate an actuator signal for driving an actuator. The implemented program codes can in some embodiments be stored for example in the memory 16 and specifically within a program code section 17 of the memory 16 for retrieval by the processor 15 whenever needed. The memory 15 in some embodiments can further provide a section 18 for storing data, for example data that has been processed in accordance with the application, for example pseudo-audio signal data.

The touch input module 11 can in some embodiments implement any suitable touch screen interface technology. For example in some embodiments the touch screen interface can comprise a capacitive sensor configured to be sensitive to the presence of a finger above or on the touch screen interface. The capacitive sensor can comprise an insulator (for example glass or plastic), coated with a transparent conductor (for example indium tin oxide—ITO). As the human body is also a conductor, touching the surface of the screen results in a distortion of the local electrostatic field, measurable as a change in capacitance. Any suitable technology may be used to determine the location of the touch. The location can be passed to the processor which may calculate how the user's touch relates to the device. The insulator protects the conductive layer from dirt, dust or residue from the finger.

In some other embodiments the touch input module can be a resistive sensor comprising of several layers of which two are thin, metallic, electrically conductive layers separated by a narrow gap. When an object, such as a finger, presses down on a point on the panel's outer surface the two metallic layers become connected at that point: the panel then behaves as a pair of voltage dividers with connected outputs. This physical change therefore causes a change in the electrical current which is registered as a touch event and sent to the processor for processing.

In some other embodiments the touch input module can further determine a touch using technologies such as visual detection for example a camera either located below the surface or over the surface detecting the position of the finger or touching object, projected capacitance detection, infra-red detection, surface acoustic wave detection, dispersive signal technology, and acoustic pulse recognition. In some embodiments it would be understood that 'touch' can be defined by both physical contact and 'hover touch' where there is no physical contact with the sensor but the object located in close proximity with the sensor has an effect on the sensor.

The apparatus 10 can in some embodiments be capable of implementing the processing techniques at least partially in hardware, in other words the processing carried out by the processor 15 may be implemented at least partially in hardware without the need of software or firmware to operate the hardware.

The transceiver 13 in some embodiments enables communication with other electronic devices, for example in some embodiments via a wireless communication network.

The display 12 may comprise any suitable display technology. For example the display element can be located below the touch input module and project an image through the touch input module to be viewed by the user. The display 12 can employ any suitable display technology such as liquid crystal display (LCD), light emitting diodes (LED), organic light emitting diodes (OLED), plasma display cells, Field emission display (FED), surface-conduction electron-emitter displays (SED), and Electophoretic displays (also known as electronic paper, e-paper or electronic ink displays). In some embodiments the display 12 employs one of the display technologies projected using a light guide to the display window.

The concept of the embodiments described herein is to implement simulated experiences associated with user interface elements or displayed information elements. Displayed information elements or tags can be any display component which has associated a defined information component. For example a displayed information element can be a social media tag. However as described herein the displayed information element can be any link or display icon, for example display icons within a game, and particularly a multiplayer game, instant messaging information displays, voice call display elements, and organisational management display elements. The simulated experience can be output using the display and tactile outputs and in some embodiments display, tactile and audio outputs. In some embodiments the simulated experiences are simulations of an experience wished to be experienced and associated with a displayed information element such as a social media input. Furthermore these tactile effects can be any suitable haptic feedback.

Figure 2:
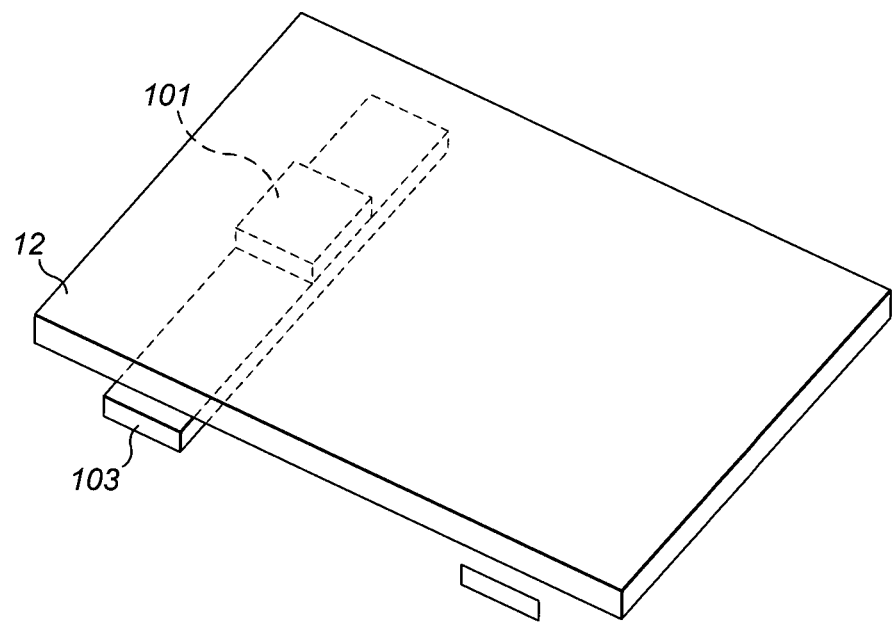
FIG. 2 shows schematically an example tactile audio display with transducer suitable for implementing some embodiments.

An example tactile audio display component comprising the display and tactile feedback generator is shown in FIG. 2. FIG. 2 specifically shows the touch input module 11 and display 12 under which is coupled a pad 101 which can be driven by the transducer 103 located underneath the pad. The motion of the transducer 103 can then be passed through the pad 101 to the display 12 which can then be felt by the user. The transducer or actuator 103 can in some embodiments be a piezo or piezo electric transducer configured to generate a force, such as a bending force when a current is passed through the transducer. This bending force is thus transferred via the pad 101 to the display 12.

Figure 3:
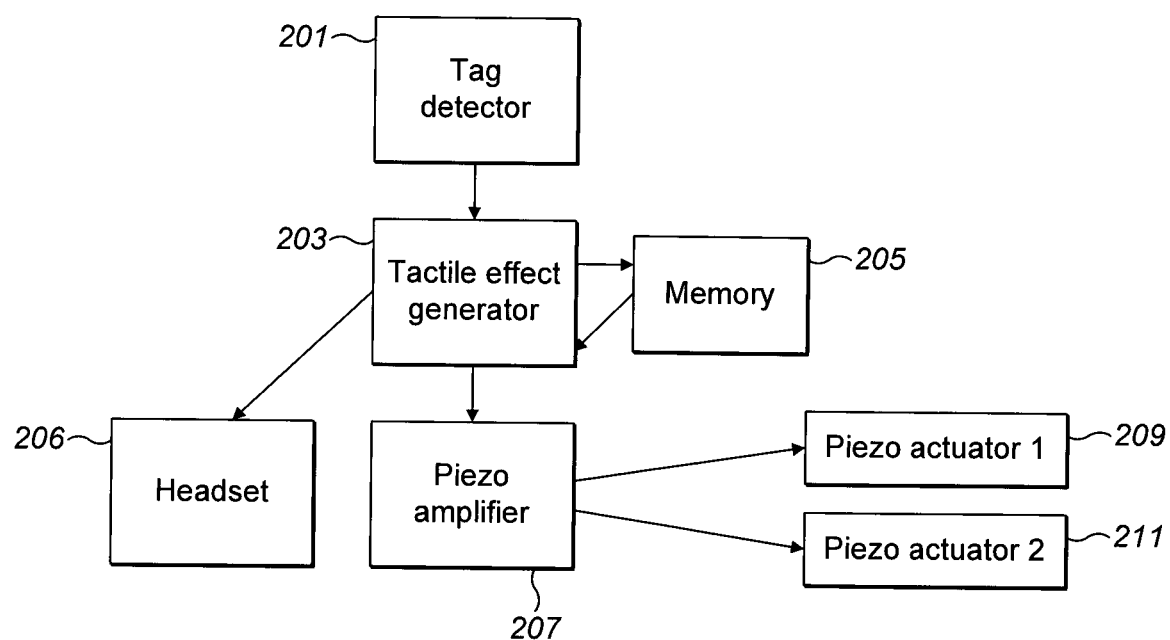
FIG. 3 shows schematically tactile effect generation system apparatus with 2 piezo actuators with respect to a social media effect generation according to some embodiments.
Figure 4:
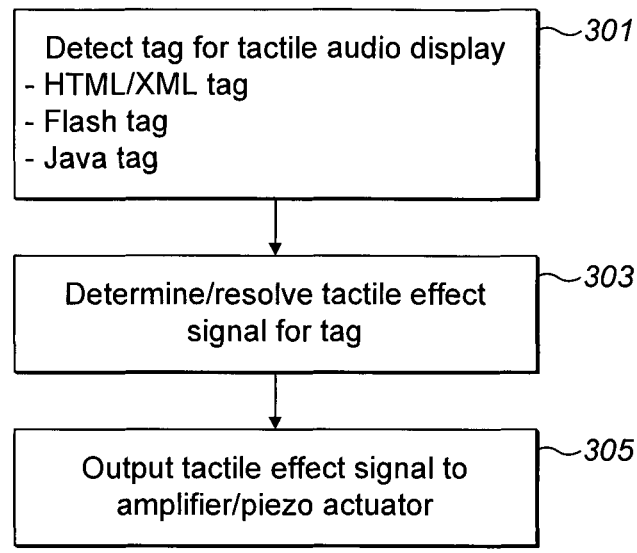
FIG. 4 shows a flow diagram of the operation of the touch effect generation system apparatus with respect to a social media effect generation according to some embodiments.
Figure 6:
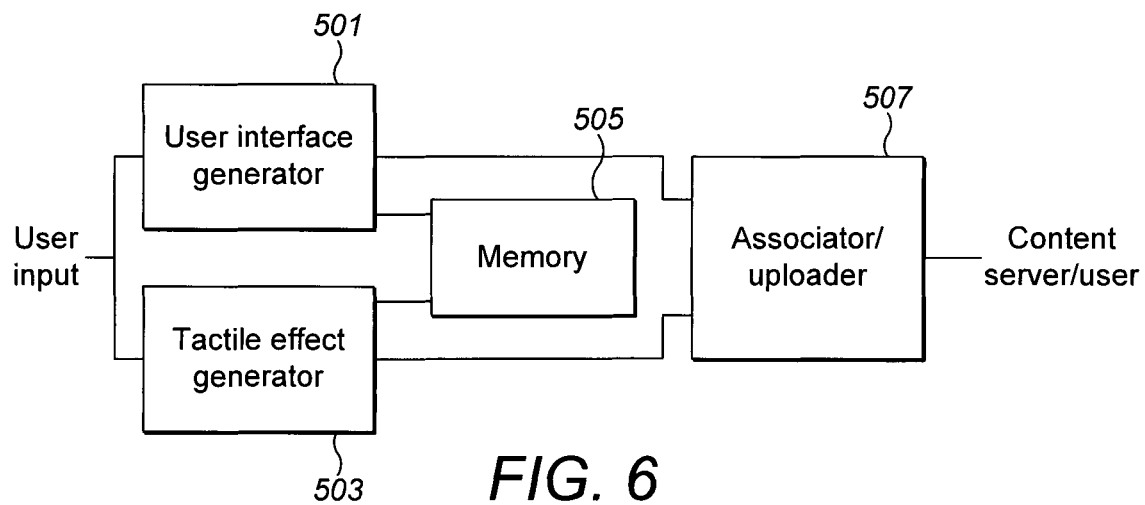
FIG. 6 shows schematically a tactile effect user interface element generator according to some embodiments.
Figure 7:
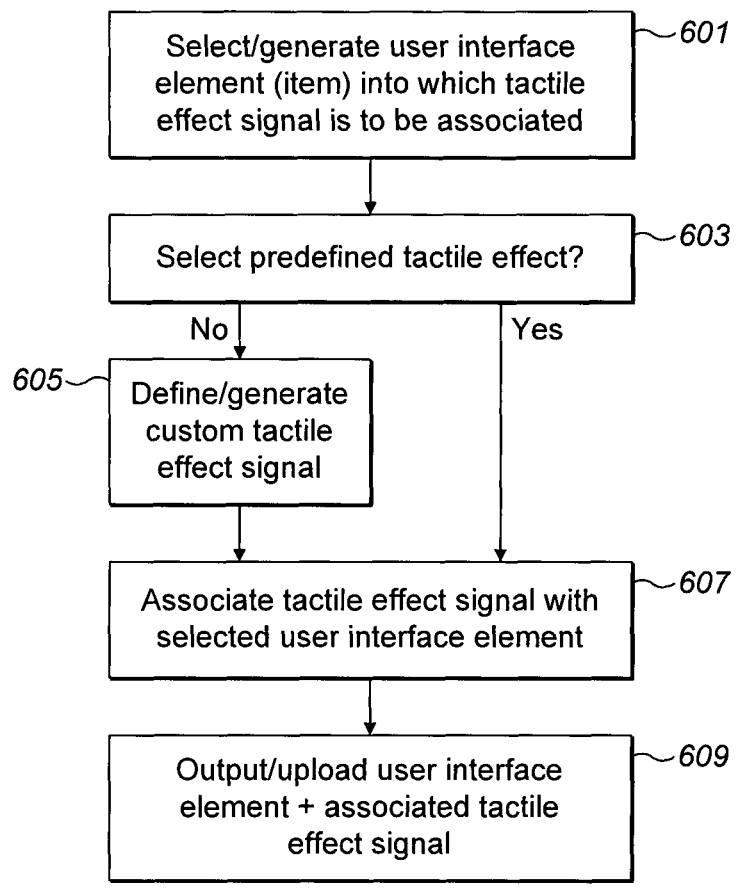
FIG. 7 shows a flow diagram of the operation of the tactile effect user interface element generator as shown in FIG. 6 according to some embodiments.

In the following examples the generation of suitable tactile effect user interface elements (such as shown in FIGS. 6 and 7) and the display of the user interface element and generation of the tactile effect when the user interface element is accessed (such as shown in FIGS. 3 and 4) are described further.

In the following example the generation of suitable tactile effect user interface elements and the display of the user interface element and generation of the tactile effect when the user interface element is accessed can be performed on mobile apparatus as described herein, or on desktop or any suitable computing apparatus. In some embodiments the generated tactile effect user interface elements can be stored on a third party apparatus, such as a social media server, which is then accessed, downloaded or viewed by the apparatus configured to display the user interface element and generate the tactile effect when the user interface element is accessed. In such embodiments the tactile effect user interface generator can in some embodiments be seen as a www server, media server or other server type apparatus configured to pass to a further apparatus, such as described in detail herein information enabling the generation of tactile effects linked to information displayed on the display of the further apparatus.

With respect to FIG. 6 an example tactile effect user interface element generator is shown according to some embodiments. Furthermore with respect to FIG. 7 an example operation of the tactile effect user interface element generator is described.

In some embodiments the tactile effect user interface element generator comprises a user interface generator 501. The user interface generator can be configured to generate or select at least one user interface element to be displayed on a displayed user interface at a location on a display. The generator 501 can be configured to generate the user interface element in any suitable manner. For example in some embodiments the generator 501 is a graphical user interface application for generating user interface components, and in some embodiments user interface components at determined locations on a display window. In some embodiments the generator 501 is a text or data entry or capture apparatus configured to convert entered text or data into a suitable content or social media format. In some embodiments the generator 501 is configured to receive a selection of defined user interface elements. In some embodiments the tactile effect user interface element generator is configured to generate any suitable social media content item.

Examples of social media content items can be content text, content audio, content image, or content video. In some embodiments the tag can be implemented as any suitable tag or information format. For example the tag can be implemented in some embodiments as a html tag, a xml tag, a flash tag, or a java tag. In some embodiments the user interface generator can configure a touch based response tag. The touch based response tag can for example define when or where a tactile effect is to be generated associated with the user interface. For example the touch based response tag can be a touch location, a defined number of touches, the pressure of the touch, the duration of the touch, the speed or direction of the touch.

The generator 501 in some embodiments can be coupled to a memory 505 configured to store defined or pre-defined user interface elements or templates onto which the generator 501 can customise or modify.

The operation of generating or selecting a user interface element or item into which a tactile effect signal is to be associated is shown in FIG. 7 by step 601.

In some embodiments the tactile effect user interface element generator can further comprise a tactile effect generator 503 configured to generate a tactile feedback signal or indicator configured to indicate a tactile feedback signal to be output. The indicator or signal can be any suitable indicator. For example in some embodiments the tactile effect generator 503 is configured to use a defined or predefined tactile effect signal. In some embodiments the tactile effect generator 503 can be coupled to a memory 505 configured to supply suitable defined tactile effect signals or indicators to signals.

In some embodiments the tactile effect generator 503 is configured to offer or output a list of predefined or preset files or indicators of tactile effect signals from where the user can select from. The preset files can be for example a 'Click' tactile effect signal, a 'Button' tactile effect signal, a 'Pillow' tactile effect signal and a 'Water' tactile effect signal.

The operation of checking whether the tactile effect selected is predefined effect is shown in FIG. 7 by step 603.

Where the tactile effect selected is not a predefined effect then the tactile effect generator can be configured to generate or define a custom tactile effect signal. In some embodiments the tactile effect generator 503 can be configured to 'capture' a tactile effect from the tactile audio display. In other words the user of the apparatus can be configured to record a tactile effect by tapping or moving the display at a point or area which can then be used as the tactile effect.

In some embodiments the 'capture' or 'recording of the tactile effect can be performed using a microphone input. The microphone input can be used in such embodiments to define the haptic feedback. The tactile effect generator 503 in such embodiments can record a certain or defined time period of audio and use the recorded audio as the selected tactile feedback.

In some embodiments the tactile effect generator can be configured to process the recorded audio. For example in some embodiments the tactile effect generator can be configured to perform a low-pass filtering to filter out the audible higher frequencies, or in some embodiments perform pitch shifting to pitch shift the audible frequencies to haptic feedback frequencies. In some embodiments the tactile effect generator 503 can be configured to perform noise cancellation to remove background noise contamination of the tactile effect signal. In some embodiments any arbitrary signal processing can be applied to the feedback signal.

As shown herein the tactile effect or haptic feedback signal is an audio signal in some embodiments the definition of the tactile effect can be created within a custom tactile effect generator program or application where tactile effects can be generated and 'tested'.

Figure 8:
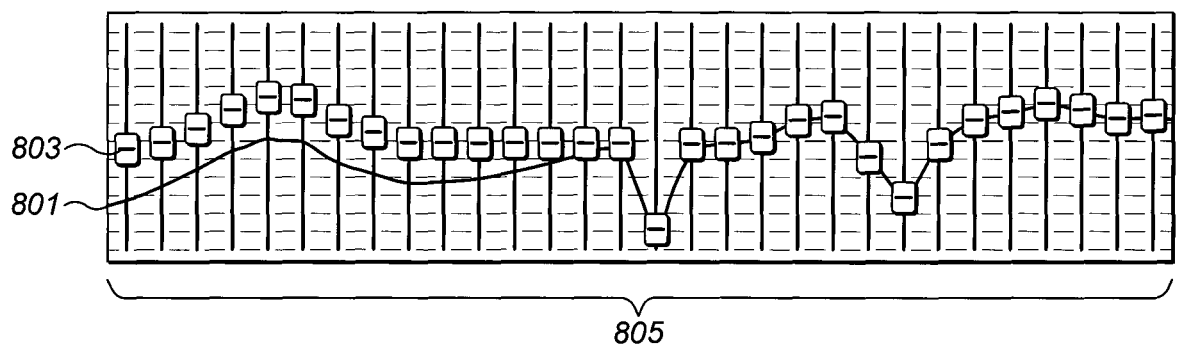
FIG. 8 shows an example tactile effect generator user interface.

In some embodiments the custom tactile effect generator program or application can, as shown in FIG. 8 define the haptic feedback waveform 801 using a graphic equalizer type of control. In this case the x axis 805 would be time. The time (in other words the length of the haptic effect signal) in some embodiments can be user definable in which case there would be more or less knobs 803 (or sliders) or the time resolution of each knob (slider) 803 would change. In some embodiments the time of the haptic effect signal is fixed. In some embodiments a haptic (tactile or audio signal) signal can be generated by the user drawing a signal curve freehand or with pre-selected elements designing a curve.

In some embodiments the tactile effect signal (or haptic feedback) can be defined as a link to a tactile effect signal or haptic feedback file that is elsewhere. For example an HTML link. In some embodiments the link or indicator can allow the tactile effect generating apparatus generating the tactile effect to define the tactile effect signal being output. In other words in some embodiments the tactile effect signal is defined completely by the tactile effect user interface generator, and in some embodiments the tactile effect user interface generator defines an indicator or link which can be configured to access a web site (for example a www site called www.tactilefeedbacks.nokia.com). The web site in some embodiments comprises tactile feedback signals which can be referred and downloaded based on the indicator. For example the indicator can be used to select and download a file such as http://www.tactilefeedbacks.nokia.com/feedbacks/quick.wav.

In some embodiments the tactile effect generator can be further configured to permit the user to define the nature or the characteristics of the feedback. In some embodiments the tactile effect generator can be configured to accept user interface inputs in the form of radio button option selections, menu selections or switched inputs which select one from a list of multiple adjectives from which the user can select from. With respect to FIG. 9 a series of possible example lists or options, each with multiple option variables from which at least one can be selected. Furthermore with respect to FIG. 10 an operation of applying the example lists or options to defined base signal is shown.

In some embodiments the base signal can be selected by the tactile effect generator. As has been discussed the base signal can be obtained using any suitable method.

Figure 10:
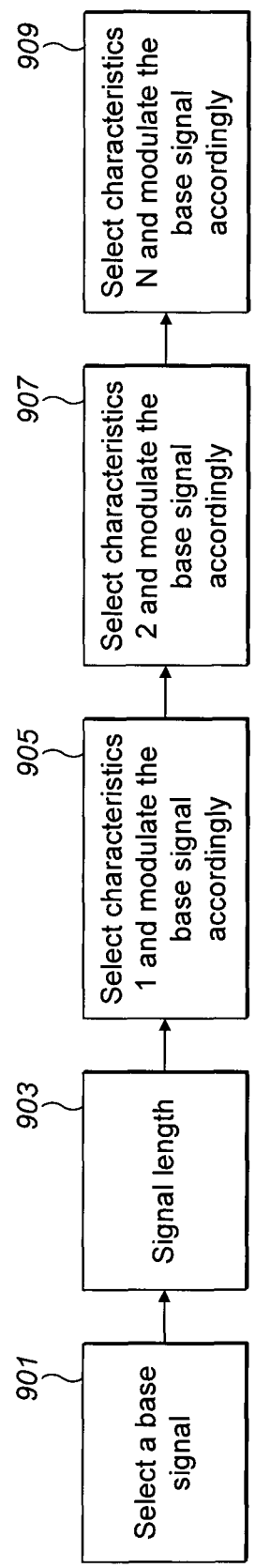
FIG. 10 shows a flow diagram of the operation of the application of the example list and options to a base tactile effect signal according to some embodiments.

The operation of selecting the base signal is shown in FIG. 10 by step 901.

Figure 9:
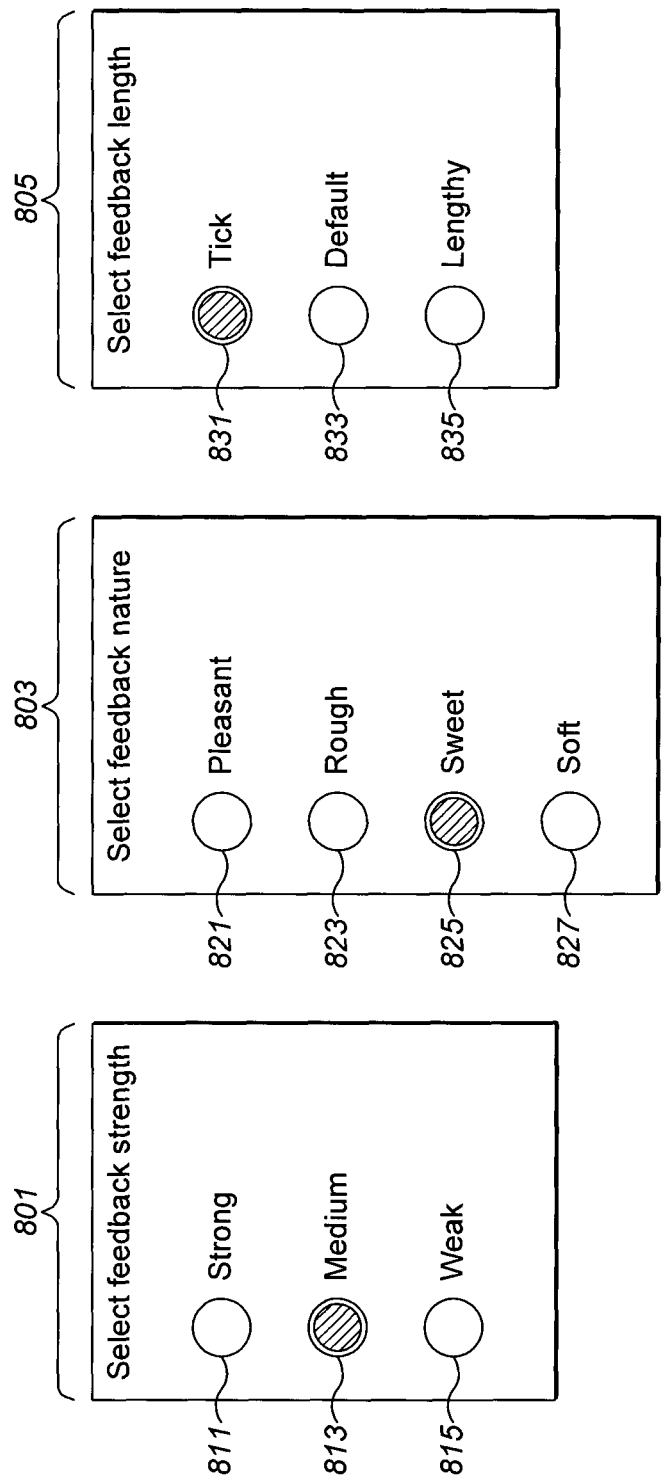
FIG. 9 shows examples of series of possible example lists or options for the configuration of tactile effects according to some embodiments.

A first list is a 'feedback length' option 805 list. The 'feedback length' option 805 list can for example as shown in FIG. 9 have the values of 'Tick' 831, 'Default' 833 and 'Lengthy' 835. The selection of the 'feedback length' option 805 can in some embodiments cause the tactile effect generator to lengthen or shorten the output signal. For example a 'Tick' option selection can cause the tactile effect generator to output a short length signal, a 'default' option selection can cause the tactile effect generator to output a medium length signal and the 'lengthy' option selection can cause the tactile effect generator to output a long length signal.

The operation of defining the signal length is shown in FIG. 10 by step 903.

A second list is a 'feedback strength' option 801 list. The 'feedback strength' option 801 list can for example as shown in FIG. 9 have the values of 'Strong' 811, 'Medium' 813 and 'Weak' 815. The selection of the 'feedback strength' option 801 can in some embodiments cause the tactile effect generator to apply a gain, dynamic range control setting, or attenuation factor to the base signal. For example a 'Strong' option selection can apply a gain to the base signal, a 'Medium' option selection can retain the base signal unmodified and the 'Weak' option selection can attenuate the base signal. In some embodiments any arbitrary signal processing can be applied to the feedback signal based on the characteristic selection.

The selection and application of a first characteristic or option is shown in FIG. 10 by step 905.

A third list is a 'feedback nature' option list 803. The 'feedback nature' option 803 list can for example as shown in FIG. 9 have the values of 'Pleasant' 821, 'Rough' 823, 'Sweet' 825 and 'Soft' 827. The selection of the 'feedback nature' option 801 can in some embodiments cause the tactile effect generator to apply a frequency filtering to the base signal. It would be understood that in some embodiments any arbitrary signal processing can be applied to the feedback signal based on the characteristic selection.

The selection and application of a second characteristic or option is shown in FIG. 10 by step 905.

It would be understood that in some embodiments there may be more than two characteristics chosen. For example with respect to FIG. 10 the selection and application of a N'th characteristic or option is shown in step 907. Furthermore it is understood that in some embodiments there can be fewer than two characteristics chosen.

In some embodiments the tactile signal or indicator can comprise at least one of: a tactile feedback signal file, a tactile feedback signal link to a memory location within an apparatus; and a tactile feedback signal link to a network location external to an apparatus.

In some embodiments the tactile effect generator can be configured to output the defined or selected tactile effect signal or signal indicator to an associator/uploader 507.

As shown in FIG. 7 the operation of generating or defining the custom tactile effect signal is shown in step 605.

In some embodiments the tactile effect user interface element generator comprises an associator/uploader 507 configured to associate the tactile feedback signal or signal indicator with the at least one user interface element to be displayed on a displayed user interface at the location on the display. In some embodiments this can comprise uploading within a defined file format supported by a server hosting the user interface information or a suitable user equipment or electronic apparatus suitable for displaying the user interface. The defined file format can be considered to be a suitable output or output means configured to output the at least one user interface element to be displayed on a displayed user interface at a location on a display and the tactile feedback signal indicator.

For example in some embodiments the associator can be configured to transmit a short message service message comprising the at least one user interface element and a tactile feedback signal indicator. In some embodiments the associator 507 can be configured to transmit a network message comprising the at least one user interface element and the tactile feedback signal indicator. In some further embodiments the associator 507 can be configured to transmit a server message comprising the at least one user interface element and the tactile feedback signal indicator. Furthermore in some embodiments the associator 507 can be configured to transmit an application message comprising the at least one user interface element and the tactile feedback signal indicator.

With respect to FIG. 3 a suitable tactile effect display apparatus with respect to social media tactile effect generation is described with respect to some embodiments. Furthermore with respect to FIG. 4 the operation of a suitable tactile effects display apparatus with respect to some embodiments is further described.

In some embodiments although not described herein in further detail the at least one user interface element and the tactile feedback signal can be received by the apparatus and the user interface element displayed on the display at a location defined by at least one of the tactile effect display apparatus and the tactile effect user interface element generator.

In some embodiments the apparatus comprises a tag detector 201. The tag detector 201 can be configured to receive input from the tactile audio display or touch screen. The tag detector 201 can then be configured to process these inputs to generate suitable digital representations or characteristics associated with the location of touch inputs. The tag detector 201 can in some embodiments be configured to receive information from a further apparatus comprising the associated user interface element and tactile feedback signal/signal indicator. In some embodiments the associated user interface element and tactile feedback signal/signal indicator can be described as a user interface tag defining the tactile feedback signal/signal indicator and associated with a user interface element.

Although the touch parameter is described herein as being a touch location, it would be understood that the touch parameter can be any suitable parameter or combination of parameters which are matched against a tag parameter list. For example the touch parameters can comprise at least one of: number of touches, the pressure of the touch, the duration of the touch, the speed or direction of the touch etc.

In some embodiments the tag detector 201 can be configured to process the touch parameter in the form of touch location input to determine whether or not there is a tactile audio display tag or tactile tag associated with the location of the touch.

The tag can be any suitable indicator associated with a social media content item such as content text, content audio, content image, or content video. In some embodiments the tag can be implemented as any suitable tag or information format. For example the tag can be implemented in some embodiments as a html tag, a xml tag, a flash tag, or a java tag.

The tag can in some embodiments comprise information concerning whether a tactile effect is to be generated when the touch is at the location, which tactile effect is to be generated, and where the tactile effect is to be generated.

In some embodiments the tag generator can be configured to pass the determined tag identifier and any associated determined tag information to the tactile effect generator 203.

The operation of determining any tags associated with media content for the tactile audio display is shown in FIG. 4 by step 301.

In some embodiments the apparatus comprises a tactile effect generator 203. The tactile effect generator 203 can in some embodiments be configured to receive any determined tags (and associated information).

In some embodiments the tactile effect generator 203 can be configured to 'look up' the tag and receive information or data from the memory 205. For example in some embodiments the tactile effect generator 203 can be configured to retrieve specific tactile effect signals from the memory in the form of a look up table dependent on the determined tag 203.

It would be understood that in some embodiments the tag can comprise the tactile effect signal in the information associated with the tag. In some embodiments the tag or displayed information element can comprise at least one field. The field can in some embodiments be associated with a value. The value can be numerical, text, Boolean or any suitable format. In some embodiments the tactile effect generator can be configured to generate a tactile effect signal based on or dependent on the field and the value of the field.

In some embodiments the tactile effect signal generator (or suitable means for generating a tactile feedback signal) can generate a signal which is uniquely associated with the field value. For example where the field can take values of A, B, or C, then the tactile effect generator can be configured to output a signal α when determining a value A, a signal 13 when determining a value B, and a signal γ when determining a value C.

In some embodiments the tactile effect generator 203 or suitable means for generating a tactile feedback signal can be configured to generate a signal for the value of the field using a base signal changed to an arbitrary signal using any suitable signal processing method. For example in some embodiments at least one of the following signal processing operations can be performed on the base signal: amplitude modulation (application of a gain factor to the base signal dependent on the value); frequency modulation (application of a frequency shift to the base signal dependent on the value); and phase modulation (application of a phase shift to the base signal dependent on the value).

In some embodiments, for example where the tactile effect can be 'positioned' on the display then the tactile effect generator 203 can in some embodiments further determine the location where the tactile effect is to be output. The apparatus in such embodiments can comprise more than one piezo-electric transducer located under the display surface at various locations and be individually controlled to generate a different tactile effect signal to each or groups of transducers. The positioning of the tactile effect can for example be resolved to be centred at the touch position where the tag is 'located', in other words where the social media content is 'located' on the display and thus the tactile effect generator 203 is configured to control the transducers to reflect the positioning of the content.

The operation of determining or resolving the tactile effect signal for the tag is shown in FIG. 4 in step 303

In some embodiments the apparatus comprises a memory 305. The memory 305 can be configured to communicate with the tactile effect generator 303. In some embodiments the memory 305 can be configured to store suitable tactile effect "audio" signals which when passed to the piezo amplifier 307 generates suitable haptic feedback using the tactile audio display.

In some embodiments the tactile effect generator can output the generated effect to the piezo amplifier 207.

In some embodiments the apparatus comprises a piezo amplifier 207. The piezo amplifier 207 can be a single channel or multiple channel amplifier configured to receive at least one signal channel output from the tactile effect generator 203 and configured to generate a suitable signal to output to at least one piezo actuator. In the example shown in FIG. 3 the piezo amplifier 207 is configured to output a first actuator signal to a first piezo actuator (piezo actuator 1) 209 and a second actuator signal to a second piezo actuator (piezo actuator 2) 211.

It would be understood that the piezo amplifier 207 can be configured to output more than or fewer than two actuator signals.

In some embodiments the apparatus comprises a first piezo actuator (piezo actuator 1) 209 configured to receive a first signal from the piezo amplifier 207 and a second piezo actuator (piezo actuator 2) 211, configured to receive a second signal from the piezo amplifier 207. The piezo actuators are configured to generate a motion to produce the tactile feedback on the tactile audio display. It would be understood that there can be more than or fewer than two piezo actuators and furthermore in some embodiments the actuator can be an actuator other than a piezo actuator.

It would be understood that the configuration of the tactile effect generator system can differ from the tactile effect generator system apparatus shown in FIG. 3. For example in some embodiments each piezo-electric actuator is configured to be supplied a signal from an associated piezo amplifier. Thus for example the first piezo actuator (piezo actuator 1) 209 can in some embodiments receive an actuation signal from a first piezo amplifier and the second piezo actuator (piezo actuator 2) 211 receive a second actuation signal from a second piezo amplifier.

It would be understood that in some embodiments the tactile effect generator system apparatus can be configured to output audio as well as tactile signals via the piezo-electric actuators dependent on the signal generated by the tactile effect generator 203. For example it would be understood that the frequency range of the signal that is output by the tactile effect generator can be higher than the tactile signal range and thus generate an audio signal in combination with the tactile signal.

Furthermore in some embodiments the tactile effect generator system apparatus can comprise a vibra (or vibra motor) configured to receive an actuation signal from the tactile effect generator. Thus in some embodiments the tactile effect generator 203 can be configured to output a tactile effect signal to the vibra causing the vibra to vibrate the whole of the apparatus. In some embodiments the tactile effect signals passed to the piezo-electric actuators can be configured to generate an apparatus wide vibration, for example by synchronizing the vibrations generated by each individual actuator to simulate the effect of an apparatus vibra.

In some embodiments the audio signal output can be directed to a separate output. For example as shown in FIG. 3, the tactile effect generator system comprises a headset 206 configured to receive an audio signal from the tactile effect generator 203. In such embodiments the tactile effect generator 203 is further configured to generate not only tactile "audio" signals which are passed to the piezo actuator but configured to generate an audio signal which can be output to an external device such as the headset 206. Thus in some embodiments the tactile effect generator 203 can be configured to generate an external audio feedback signal concurrently with the generation of the tactile feedback or separate from the tactile feedback.

The operation of outputting the tactile effect signal is shown in FIG. 4 by step 305.

Figure 5:
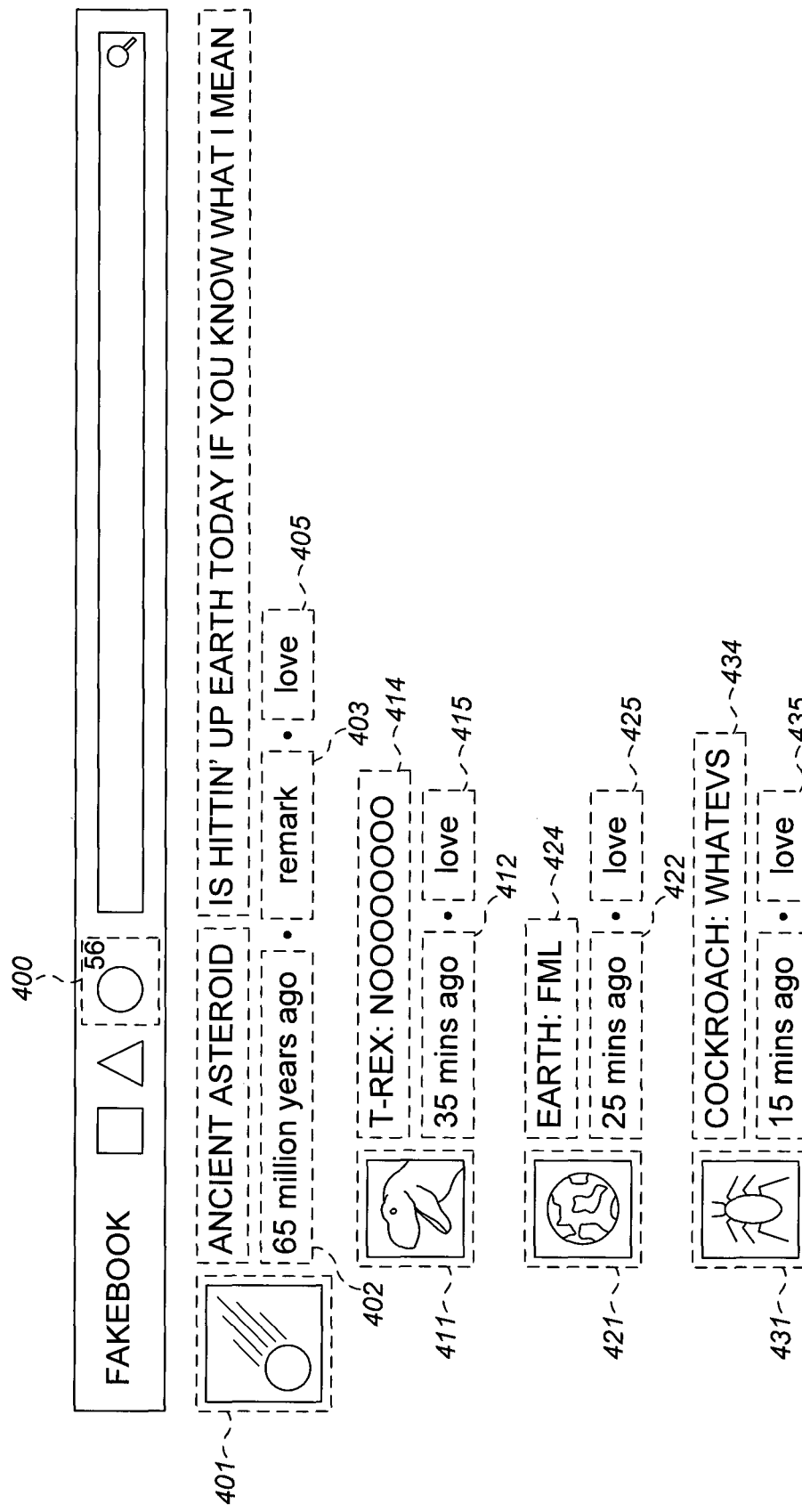
FIG. 5 shows an example of social media effect generation according to some embodiments.

With respect to FIG. 5 example social media content haptic or tactile effect generation is shown. The example shows an example or representation of displayed social media content. The social media content can, as shown in FIG. 5, be associated with tags having effective areas or ranges. The user of the apparatus with the display when touching a position over a tag enables the tag to be detected and a tactile effect generated by the display based on the tag. In other words within the content code generating the display are tags which are configured to be detected and a tactile effect generated dependent on the detection of the tag.

For example a first type of tag can be a header tag. A header or information tag can in some embodiments be part of an information banner summarizing content information. For example an information tag can in some embodiments be a 'unread content' tag 400 which can be associated with an image indicating whether there is any new or unread content and furthermore in some embodiments the amount of content which is new or unread. The 'unread content' tag can in some embodiments be configured to provide an indicator or information to the tactile effect generator when detected generating tactile or haptic feedback indicating the number of messages or other content unread. In some embodiments the tactile effect can be designed such that the greater the number of unread content entries the greater the effect is. For example the tactile effect signal can be modified based on the number of unread content such that the unread content amount is related to the frequency of the signal output (for example a higher or lower frequency signal as the amount increases). In some embodiments the tactile effect signal can be modified such that the amplitude of the tactile effect is dependent on the amount of unread content.

A second type of tactile effect tag can be a content provider relationship or profile picture or 'user identifier' tag. In such embodiments the haptic feedback tactile effect signal can be associated with a profile picture or image. For example in FIG. 5 there are shown four content generator user identifiers or profile pictures, a first "ancient asteroid" profile picture tag 401, a second "T Rex" profile picture tag 411, a third "Earth" profile picture tag 421, and a fourth "Cockroach" profile picture tag 431.

In some embodiments the tag can be defined by the content provider (in other words the user selecting the picture) either by the tag identifying a known tactile effect or modification of a known tactile effect signal (in other words the tag is used to look up the tactile effect signal stored in the memory and/or the parameters used to modify the tactile effect signal stored in the memory).

In some embodiments the content receiver or content viewer can set or select the tactile effect signal associated with the tag. For example the content reader can be configured to assign a tactile effect signal to each of their friends profile pictures in order to identify their friend by their tactile feedback.

In some embodiments the setting or selection of tactile effect signals is based on selected groups of friends and any profile picture or user identifier associated with the group can be assigned a tactile effect signal. Thus for example in some embodiments the tactile effect signal can be based on the relationship between the content viewer and the content provider, for example the profile picture or user identifier associated with the content provider member is a 'friend', 'an associate', 'a colleague at work', 'family', 'son', 'daughter', etc.

In some embodiments the displayed information element is an 'activity level' associated with the frequency of activity of the user posting comments or displaying their avatar or image representing themselves. For example in some embodiments the profile picture can be the displayed information element and the frequency of posts or comments affect the tactile effect signal output when the user touches the display over the profile picture.

In some embodiments the tactile effect signal is based on the "depth" or degrees of separation of a relationship between the user and the person in the viewer's social network. For example in some embodiments the tactile effect signal feedback from direct friends (1 degree of separation) could be stronger than the feedback from a friend's friend (2 degrees of separation) and furthermore the friend's friend tag stronger than the feedback from a friend's friend's friend tag (3 degrees of separation). In some embodiments the degree of separation can be reflected by a change of frequency, for example the greater the degree of separation the higher the frequency.

In some embodiments the displayed information element or tag is a URL embedded within a social media context. The URL can for example be configured to enable the apparatus to link to a web site, for example a retailer's web site. In such embodiments the tag can be configured to generate a tactile effect signal when a finger is moved over the displayed information element.

In some embodiments the suggested option can be a 'people you know' or 'candidate' tag where an icon or tag representing a user of the system which is not in the apparatus user's social network but is suggested as a potential candidate can have an associated tactile effect signal. For example in a LinkedIn type system the 'people you know' candidates could be indicated with tactile feedback.

A third example of a tactile effect tag is a 'content emotion' tag. In the example shown in FIG. 5 there are four 'content emotion' tags shown, a first "ancient asteroid" content emotion tag 404, a second "T Rex content emotion" tag 414, a third "Earth content emotion" tag 424 and a fourth "Cockroach content emotion" tag 434. In some embodiments the tactile effects generator can be configured to receive the determiner content emotion tag which comprises information indicating or requesting a specific tactile effect signal to be generated when the touch is over the content— such as the status update. As described herein in some embodiments the content provider can be configured to supply the tactile effect signal to be passed to the actuators however in some other embodiments the content emotion tag can be looked up by the tactile effect generator and a suitable tactile effect generated.

For example the content emotion tag can be an update or status update content emotion tag. Thus for example the status update content emotion tag can indicate whether the content provider is 'angry', 'sad', 'happy', 'sarcastic', 'ironic', etc.

Furthermore the tag in some embodiments can be a status tag wherein the displayed information element or tag defines the status of the user and the value of the element or tag affects the tactile effect signal. For example the status tag can be an 'availability' status tag identifying the availability of the user to use some form of instant messenger or 'chat' communications. In such embodiments for example an available tag can be associated with a tactile effect signal, a busy or engaged tag associated with a further different or modified tactile effect signal, and an off-line or away from keyboard (afk) status associated with a null or no tactile effect signal. Examples of such communications systems include the Facebook 'chat' communications, VoIP communications such as provided by Skype and Lync, blackberry messenger, and IRQ.

In some embodiments the displayed information element or tag is the 'publicity level' or 'privacy' setting associated with the message or content displayed. For example in some embodiments the displayed content or message has associated with it a tag indicating to whom the content or message is available. In some embodiment the 'publicity level' or 'privacy' setting value affects the tactile effect signal. Thus for example a 'friends only' privacy setting tag has a first associated tactile effect signal and an 'available for all' privacy setting tag has a second associated tactile effect signal.

In some embodiments the tactile effect tag or displayed information element is a 'suggested' displayed information tag where the apparatus display is showing a suggested link or candidate to select. In such embodiments the 'suggested' or preferred option can be associated with a tactile effect signal which can be output when the touch is over the display at the location of the suggested or preferred option. For example the apparatus can display a dialogue or response box requesting an input such as a 'ok' selection, a 'yes' or 'no' selection or an 'accept' or 'cancel' selection where a suggested or preferred option is associated with a tactile effect signal and the other option has no tactile effect signal associated with it.

FIG. 5 furthermore shows a further example of a tactile effect tag, a "content timestamp" tag or displayed information element. FIG. 5 shows four "content timestamp" tags, a first "ancient asteroid" timestamp tag 402, a second "T Rex" timestamp tag 412, a third "earth" timestamp tag 422 and a fourth "cockroach" timestamp tag 432. In some embodiments the value of the time or date at which the content was generated or displayed can be included and sent to the tactile effects generator 203.

The tactile effect can in some embodiments generate a tactile effect or modify a previously determined tactile effect signal using the value of the timestamp tag 402, 412, 422, 432. For example in some embodiments the timestamp tag can modify the effect generated by the 'content emotion' tag. In other words in some embodiments the tag can affect a tactile effect signal associated with a different tag.

In some embodiments, the tactile effect or tactile effect modification can be dependent on the value of the timestamp. For example in some embodiments the further ago the content timestamp the weaker the tactile effect signal generated. Thus the user can identify the latest updates. For example the first timestamp tag 402 with a first value '65 million years ago' produces a very weak tactile effect, the second timestamp tag 412 '35 min ago' has a stronger tactile effect compared to the first timestamp tag, the third timestamp tag 422 '25 min ago' has a stronger tactile effect compared to the second timestamp tag, and the fourth timestamp tag 432 '15 min ago' has the strongest tactile effect signal output compared to the first to third timestamp tag tactile effect signal. The weakening or strengthening of the effect can be achieved by weakening or strengthening the amplitude of the tactile effect signal.

The example shown in FIG. 5 shows further 'defined input' or 'defined link' tags to identify suitable input button or link locations such as the 'remark' tag 403 which can be configured to generate a tactile effect indicating any suitable commenting or remarking input selection commenting on the content provided and the 'love' tag 405 which can be configured to generate a tactile effect indicating a liking or loving of the content provided such as a liking of the comment or status update.

It would be understood that in some embodiments the 'love' or like tag 405, 415, 425, 435 can have—opposite dislike or 'hate' tag which has a different tactile haptic effect to the 'love' or like tag tactile effect signal.

It would be understood that in some embodiments the tag or displayed information element can be a 'follow' tag. The tag to follow or unfollow someone can be indicated with tactile feedback by linking a tactile effect signal to a dedicated follow or unfollow display element or message or to a profile picture.

Furthermore in some embodiments it would be understood that the tag or displayed information element can be a 'join group' tag. The tag to join or leave a group can be indicated with tactile feedback by linking a tactile effect signal to a dedicated 'join group' or 'leave group' display element or message.

In some embodiments the tag or displayed information element can be a 'hashtag' or 'keyword' tag. The 'hashtag' or 'keyword' tag can in some embodiments be configured to generate a tactile effect signal on the determination or detection of a hashtag or 'keyword' on the display when the user is touching the hashtag or 'keyword'. In some embodiments the tactile effect signal can be based on or dependent on the value of the hashtag or 'keyword'. Thus in some embodiments the content provider can link an associated hashtag or 'keyword' tag value with a defined tactile effect signal such that when a user touches the hashtag or 'keyword' a defined tactile signal is output. In some other embodiments the hashtag or 'keyword' tag can be configured by the user of the content, for example as a tactile search tool so that the user can quickly move their finger down the display until they feel the hashtag or 'keyword' response from many displayed entries.

Similarly in some embodiments the tag or displayed information element can be a 'mention' or user identifier tag, where the display comprises a user identifier or 'mention' (such as a @username mention). The user identifier or 'mention' tag can in some embodiments be configured to generate a tactile effect signal on the determination or detection of a user identifier or 'mention' on the display when the user is touching the user identifier or 'mention'. In some embodiments the tactile effect signal can be based on or dependent on the value of the user identifier or 'mention'. Thus in some embodiments the content provider can link an associated user identifier or 'mention' tag value with a defined tactile effect signal such that when a user touches the user identifier or 'mention' a defined tactile signal is output. In some other embodiments the user identifier or 'mention' tag can be configured by the user of the content, for example as a tactile search tool so that the user can quickly move their finger down the display until they feel the user identifier or 'mention' response from many displayed entries.

It would be understood that in some embodiments there can be emoticon tags. The emoticon tag can be associated with a defined emoticon and be configured to enable the generation of a tactile effect signal. For example the smiley emoticon ;→ or ☺ can be associated with a tactile effect signal of a 'giggle' with an associated audio giggle signal.

In some embodiments the tag or displayed information element can be a feedback element or tag. The feedback element or tag can contain a feedback rating field with a value dependent on individual users ratings of the item or image of the person displayed. For example an online marketplace can have associated with each item for sale a product rating based on ratings of the item. These can be any suitable rating system, such as stars, ratings out of 5 or 10, or percentages or labels associated with a rating. For example a poor label for a rating of 1 (or 1 star or 1/5 or 1/10 or 0%) and an excellent label for a rating of 5 (or 5 stars or 5/5 or 10/10 or 100%). In such embodiments the tactile effect signal generator can be configured to generate a signal based on the rating value. In some embodiments the tag can be set by a feedback provider where the feedback provider specifies a specific feedback tactile effect signal to be generated. For example a feedback provider can set a 'raspberry' effect to a tag or displayed information element the feedback provider has not liked or thought was poor.

The feedback tag or displayed information element can in some embodiments be a metafeedback tag, in other words have a value defined by many separate feedback displayed information elements. For example a product or item in an online marketplace can have an average feedback value based on the feedback from many purchasers.

Similarly product or retailer links can have associated with them a scored feedback determined tactile effect signal. For example a search of toys on a retailer's www site could reveal a number of suitable toys which are displayed as images on the display. Each image can have an associated tactile effect signal (in some embodiments each image is associated with the same base tactile effect signal) where the tactile effect signal is based on the feedback other purchasers of the toy have left. For example in some embodiments the tactile effect signal amplitude can be based on a quantifiable value from the feedback such as the 'star' rating or the overall mark 'out of 10'. Thus in some embodiments the purchaser can 'feel' how good or reliable the product or retailer is.

The feedback tag or displayed information element can be implemented in any context where feedback is allowed to be made, for example Application stores such as Microsoft Market place, music ratings in music centric social networks, internet forums, news web pages, and general comment website where users can leave positive or negative feedback.

The feedback can in some embodiments therefore be based on crowd sourced or peer based feedback. For example a tag associated with a person or item (such as a product being advertised) can have a tactile effect signal which is based on the amount or feedback (positive or negative) to the person or item. In such embodiments for example the tactile effect signal can increase in amplitude or strength the more positive feedback the tag is associated with and similarly the tactile effect signal can decrease in amplitude or strength the more negative feedback the tag has. For example a comment with 0 likes can have a tactile effect signal of amplitude level 1, and for each like the comment attracts the amplitude increases until it reached a defined limit. Similarly a person tag can have a tactile effect signal which is modified or based on a rating from their peers or friends.

It shall be appreciated that the term user equipment is intended to cover any suitable type of wireless user equipment, such as mobile telephones, portable data processing devices or portable web browsers. Furthermore, it will be understood that the term acoustic sound channels is intended to cover sound outlets, channels and cavities, and that such sound channels may be formed integrally with the transducer, or as part of the mechanical integration of the transducer with the device.

In general, the design of various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The design of embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory used in the design of embodiments of the application may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be designed by various components such as Integrated circuit modules.

As used in this application, the term 'circuitry' refers to all of the following:

(a) hardware-only circuit implementations (such as Implementations in only analog and/or digital circuitry) and (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
   generating at least one user interface element to be displayed on a displayed user interface at a first determined location on a display, the first determined location on the display being configured to receive a touch, wherein the first determined location has an effective area;
   generating a tactile feedback signal indicator configured to indicate a tactile feedback signal to be output at a second determined location;
   associating the tactile feedback signal indicator with the at least one user interface element to be displayed on the displayed user interface at the first determined location on the display so as to reproduce the tactile feedback signal when the touch is received; and
   uploading information comprising at least the at least one user interface element and the tactile feedback signal indicator to a content server such that when the at least one user interface element is accessed, a tactile effect is generated at the second determined location based on the uploaded information stored on the content server.

2. The method as claimed in claim 1, wherein associating the tactile feedback signal indicator with the at least one user interface element comprises at least one of:
   transmitting control data for selecting the at least one user interface element and the tactile feedback signal indicator from a server apparatus;
   transmitting a short message service message comprising the at least one user interface element and the tactile feedback signal indicator;
   transmitting a network message comprising the at least one user interface element and the tactile feedback signal indicator;
   transmitting a server message comprising the at least one user interface element and the tactile feedback signal indicator; and
   transmitting an application message comprising the at least one user interface element and the tactile feedback signal indicator.

3. The method as claimed in claim 1, wherein the tactile feedback signal indicator comprises at least one of:
   a tactile feedback signal file;
   a recorded audio signal;
   an indicator for selecting at least one predefined audio signal;
   at least one base tactile feedback signal;
   at least one tactile feedback signal processing characteristic;
   at least one tactile feedback signal processing characteristic value;
   a tactile feedback signal link to a memory location within an apparatus; and
   a tactile feedback signal link to a network location external to an apparatus.

4. The method as claimed in claim 1, wherein generating the at least one user interface element to be displayed at the first determined location on the display comprises at least one of:
   selecting at least one defined user interface element;
   selecting at least one touch based response tag;
   generating at least one defined user interface element;
   entering text configured to generate the at least one user interface element to be displayed at the first determined location on the display; and
   generating data configured to generate the at least one user interface element to be displayed at the first determined location on the display.

5. The method as claimed in claim 4, wherein when the at least one touch based response is selected, the touch based response tag comprises at least one of:
   a touch location;
   a defined number of touches;
   a touch pressure;
   a touch duration;
   a touch speed; and
   a touch direction.

6. A method comprising:
   receiving, from a content server, a tactile feedback signal based on a tactile feedback signal indicator, the tactile feedback signal to be generated, from a graphical user interface, at a determined location on a display;
   receiving data for at least one user interface element to be displayed on a displayed user interface at the determined location on the display and the tactile feedback signal indicator associated with the at least one user interface element, a determination of the determined location on the display being configured to receive a touch, wherein the determined location on the display has an effective area; and
   generating the tactile feedback signal to be output by the display dependent on the displayed user interface and at the determined location on the display and based on the tactile feedback signal indicator such that the at least one user interface element provides a simulated experience.

7. The method as claimed in claim 6, wherein receiving the data for the at least one user interface element and the tactile feedback signal indicator associated with the at least one user interface element interface comprises at least one of:
   receiving a short message service comprising data;
   downloading the at least one user interface element and the tactile feedback signal indicator from the content server;
   receiving control data for selecting the at least one user interface element and the tactile feedback signal indicator from a server apparatus;
   receiving a network message comprising the data;
   receiving a server message comprising data; and
   receiving an application message comprising data.

8. The method as claimed in claim 6, wherein the tactile feedback signal indicator comprises at least one of:
   a tactile feedback signal file;
   a recorded audio signal;

an indicator for selecting at least one predefined audio signal;
at least one base tactile feedback signal;
at least one tactile feedback signal processing characteristic;
at least one tactile feedback signal processing characteristic value;
a tactile feedback signal link to a memory location within an apparatus; and
a tactile feedback signal link to a network location external to an apparatus.

9. The method as claimed in claim 6, wherein the at least one user interface element is associated with at least one field having a value and wherein generating the tactile feedback signal comprises generating the tactile feedback signal based on the value.

10. The method as claimed in claim 9, wherein the at least one field has a range of different values and generating the tactile feedback signal based on the value comprises generating a different tactile feedback signal for each different value within the range of values.

11. The method as claimed in claim 9, wherein the at least one field has a range of different values and generating the tactile feedback signal based on the value comprises:
determining a base tactile feedback signal based on the at least one user interface element; and
modifying the base tactile feedback signal based on the value of the field.

12. The method as claimed in claim 11, wherein modifying the base tactile feedback signal comprises at least one of:
modulating the amplitude of the base tactile feedback signal based on the value of the at least one field; and
modulating the frequency of the base tactile feedback signal based on the value of the at least one field.

13. The method as claimed in claim 9, further comprising at least one of:
generating an audio feedback signal to be output by the display dependent on the at least one user interface element; and
outputting on the display the tactile feedback signal, such that a user experiences at the determined location of the at least one user interface element the tactile feedback signal based on the at least one user interface element.

14. The method as claimed in claim 1, wherein the at least one user interface element comprises at least one of:
a social media user interface element;
a dialogue box user interface element;
an application user interface element;
a universal resource link user interface element;
a user identifier user interface element;
a profile picture user interface element;
a comment user interface element;
a hashtag user interface element;
a mention user interface element;
a feedback user interface element;
a keyword search result user interface element; and
a provided content user interface element.

15. An apparatus comprising at least one processor and at least one memory including computer code for one or more programs, the at least one memory and the computer code configured to with the at least one processor cause the apparatus at least to:
generate at least one user interface element to be displayed on a displayed user interface at a first determined location on a display, the first determined location on the display being configured to receive a touch, wherein the first determined location has an effective area;
generate a tactile feedback signal indicator configured to indicate a tactile feedback signal to be output at a second determined location;
associate the tactile feedback signal indicator with the at least one user interface element to be displayed on the displayed user interface at the first determined location on the display so as to reproduce the tactile feedback signal when the touch is received; and
upload information comprising at least the at least one user interface element and the tactile signal to a content server such that when the user interface element is accessed, a tactile effect is generated at the second determined location based on the uploaded information stored on the content server.

16. An apparatus comprising at least one processor and at least one memory including computer code for one or more programs, the at least one memory and the computer code configured to with the at least one processor cause the apparatus at least to:
receive, from a content server, a tactile feedback signal based on a tactile feedback signal indicator, the tactile feedback signal to be generated, from a graphical user interface, at a determined location on a display;
receive data for at least one user interface element to be displayed on a displayed user interface at the determined location on the display and the tactile feedback signal indicator associated with the at least one user interface element, a determination of the determined location on the display being configured to receive a touch, wherein the determined location has an effective area; and
generate the tactile feedback signal to be output by the display dependent on the displayed user interface and at the determined location and based on the tactile feedback signal indicator such that the at least one user interface element provides a simulated experience.

17. The apparatus as claimed in claim 16, wherein the at least one user interface element is associated with at least one field having a value and wherein generating the tactile feedback signal causes the apparatus to generate the tactile feedback signal based on the value.

18. The apparatus as claimed in claim 17, wherein the at least one field has a range of different values and the tactile feedback signal is generated based on one of different values in such a way that the apparatus is configured to generate a different tactile feedback signal for each different value within the range of values.

19. The apparatus as claimed in claim 18, wherein the at least one field has a range of different values and the tactile feedback signal is generated based on one of different values in such a way that the apparatus is configured to:
determine a base tactile feedback signal based on the at least one user interface element; and
modify the base tactile feedback signal based on the value of the at least one field.

20. The apparatus as claimed in claim 19, wherein when the apparatus is configured to modify the base tactile feedback signal further comprises at least one of:
modulate the amplitude of the base tactile feedback signal based on the value of the at least one field; and
modulate the frequency of the base tactile feedback signal based on the value of the at least one field.

* * * * *